United States Patent
Weigand et al.

(10) Patent No.: US 11,847,224 B2
(45) Date of Patent: Dec. 19, 2023

(54) PASSIVE MONITORING AND PREVENTION OF UNAUTHORIZED FIRMWARE OR SOFTWARE UPGRADES BETWEEN COMPUTING DEVICES

(71) Applicant: Shift5, Inc., Rosslyn, VA (US)

(72) Inventors: Michael A Weigand, Vienna, VA (US); Joshua A. Lospinoso, Falls Church, VA (US); James E. Correnti, Washington, DC (US)

(73) Assignee: Shift5, Inc., Rosslyn, VA (US)

( * ) Notice: Subject to any disclaimer, the term of this patent is extended or adjusted under 35 U.S.C. 154(b) by 367 days.

(21) Appl. No.: 17/029,175

(22) Filed: Sep. 23, 2020

(65) Prior Publication Data

US 2021/0209231 A1 Jul. 8, 2021

Related U.S. Application Data

(60) Provisional application No. 62/905,725, filed on Sep. 25, 2019.

(51) Int. Cl.
*G06F 21/57* (2013.01)
*G06F 8/65* (2018.01)
*G06F 21/64* (2013.01)

(52) U.S. Cl.
CPC .............. *G06F 21/572* (2013.01); *G06F 8/65* (2013.01); *G06F 21/64* (2013.01)

(58) Field of Classification Search
CPC .... G06F 21/572; G06F 21/565; G06F 21/563; G06F 21/564; G06F 21/562;
(Continued)

(56) References Cited

U.S. PATENT DOCUMENTS 11,405,421 B2 * 8/2022 Yokota ................ H04L 63/1425
2008/0244553 A1 10/2008 Cromer et al.
(Continued)

FOREIGN PATENT DOCUMENTS

EP          3690643 A2      8/2020
WO    WO-2007033321 A2 *   3/2007   ......... G06F 12/0246
WO       2019083440 A2      5/2019

OTHER PUBLICATIONS

Lee et al., "Secure Dissemination of Software Updates for Intelligent Mobility in Future Wireless Networks", EURASIP Journal on Wireless Communications and Networking, pp. 1-9; 2016.

(Continued)

*Primary Examiner* — Tae K Kim
(74) *Attorney, Agent, or Firm* — Myers Bigel, P.A.

(57) ABSTRACT

An apparatus for preventing unauthorized software or firmware upgrades between two or more computing devices connected on a data bus includes a cryptographic engine, memory, and at least one processor coupled with the cryptographic engine and memory. The cryptographic engine stores cryptographic metadata for authorized upgrade images for updating at least one target computing device coupled to the data bus. The cryptographic metadata includes a manifest list of upgrade images. The processor is configured to monitor the data bus for transmissions of striped update hashes from a maintenance device, to receive signed striped hashes corresponding to an upgrade image file transmitted by the maintenance device, to validate the striped update hashes using information in the manifest list, to log that an unauthorized upload has been attempted when at least one of the striped update hashes fails validation, and to perform a mitigation action(s) in response to the attempted unauthorized upload.

24 Claims, 4 Drawing Sheets

(58) Field of Classification Search
CPC .......... G06F 21/554; G06F 21/56; G06F 8/65;
G06F 8/658; G06F 8/63; G06F 21/57
See application file for complete search history.

(56) References Cited

U.S. PATENT DOCUMENTS

| | | | |
|---|---|---|---|
| 2010/0175061 A1 | 7/2010 | Maeda et al. | |
| 2012/0198514 A1* | 8/2012 | McCune | G06F 21/57 726/1 |
| 2013/0298117 A1* | 11/2013 | Reynolds | H04L 41/082 717/173 |
| 2015/0113520 A1* | 4/2015 | Kotani | G06F 8/654 717/172 |
| 2015/0191135 A1* | 7/2015 | Ben Noon | H04L 67/12 726/22 |
| 2017/0192770 A1* | 7/2017 | Ujiie | G06F 11/1433 |
| 2017/0341605 A1* | 11/2017 | Ben Noon | H04L 12/4625 |
| 2018/0029539 A1* | 2/2018 | Ben Noon | H04L 12/4625 |
| 2018/0198604 A1* | 7/2018 | Hayton | H04W 12/08 |
| 2018/0300477 A1* | 10/2018 | Galula | H04L 63/1416 |
| 2019/0217870 A1* | 7/2019 | Nakano | B60W 50/0205 |
| 2019/0387023 A1* | 12/2019 | Yokota | H04W 4/40 |
| 2020/0264864 A1* | 8/2020 | Yang | H04L 9/30 |

OTHER PUBLICATIONS

"Weapon Systems Cybersecurity: DOD Just Beginning to Grapple with Scale of Vulnerabilities," Report to the Committee on Armed Services, U.S. Senate, U.S. Government Accountability Office, Oct. 2018, GAO-19-128.
"Electronic Signature," pp. 1-12, https://en.wikipedia.org/wiki/Electronic_signature.
Extended European Search Report Corresponding to European Application No. 20870271.2 (8 pages) (dated Jun. 6, 2023).

* cited by examiner

PASSIVE MONITORING AND PREVENTION OF UNAUTHORIZED FIRMWARE OR SOFTWARE UPGRADES BETWEEN COMPUTING DEVICES

CROSS-REFERENCE TO RELATED APPLICATIONS

This application claims priority to provisional application No. 62/905,725 filed on Sep. 25, 2019, entitled "Passive Monitoring and Prevention of Unauthorized Firmware or Software Upgrades Between Computing Devices," the disclosure of which is incorporated by reference herein in its entirety for all purposes.

BACKGROUND

The present invention relates generally to the electrical, electronic and computer arts, and, more particularly, to secure firmware or software upgrades between computing devices.

Unauthorized changes to firmware, software, and/or information can occur due to errors or malicious activity (e.g., tampering), among other factors. Firmware is software that is embedded into a hardware device and generally consists of a set of commands that control how the device functions. Software includes, for example, operating systems (with key internal components such as kernels, drivers), middleware, and applications. Firmware includes, for example, a basic input output system (BIOS). Information includes metadata such as, for example, security attributes associated with information.

When a vendor releases the latest version of firmware for a certain device, the existing firmware in the device is updated to the latest release. This process is often known as a firmware upgrade. Conventionally, updating firmware or software of computing devices (e.g., electronic control units (ECUs)) connected together via serial data buses or similar network architectures typically involves transferring binary images comprising firmware or software update files from a maintenance computer temporarily connected to the bus or network to a target computing device(s) to be updated. The firmware or software update file, also known as an image, is normally distributed throughout a supply chain via electronic or physical means, such as an Internet download or through mail compact disc (CD) distribution. Because many legacy ECUs are incapable of cryptographically validating software signing signatures such as those commonly employed by public key infrastructure (PKI) backed software validation schemes, an adversary can arbitrarily upload unauthorized firmware or software to target ECUs by exploiting a compromised maintenance device or by attacking the supply chain image process. This poses critical security vulnerabilities and concerns.

SUMMARY

The present invention, as manifested in one or more embodiments thereof, beneficially provides a mechanism for passively monitoring, alerting, and preventing unauthorized firmware and/or software upgrade image transmissions between two or more computing devices connected through a data bus or other connection arrangement, either wired or wireless (e.g., communication network). An apparatus according to one or more embodiments of the invention advantageously validates firmware and/or software images uploaded to the computing devices (e.g., ECUs, line replaceable units (LRUs), etc.) using valid cryptographic signatures, without modifying existing hardware or software in the computing device(s). This technique supports passive and/or active operational modes for use with differing customer requirements.

In accordance with one embodiment of the invention, an exemplary apparatus for preventing unauthorized software or firmware upgrades between two or more computing devices connected on a data bus includes a cryptographic engine, memory, and at least one processor coupled with the cryptographic engine and memory. The cryptographic engine stores cryptographic metadata for authorized upgrade images for updating at least one target computing device coupled to the data bus. The cryptographic metadata includes a manifest list of upgrade images. The processor is configured to monitor the data bus for transmissions of striped update hashes from a maintenance device, to receive signed striped hashes corresponding to an upgrade image file transmitted by the maintenance device, to validate the striped update hashes using information in the manifest list, to log that an unauthorized upload has been attempted when at least one of the striped update hashes fails validation, and to perform a mitigation action(s) in response to the attempted unauthorized upload.

In accordance with another embodiment of the invention, an exemplary method for preventing unauthorized software or firmware upgrades between two or more computing devices connected on a data bus includes: transmitting, by a maintenance device coupled to the data bus, cryptographic metadata for authorized upgrade images to at least one target computing device coupled to the data bus, the cryptographic metadata comprising a manifest list of upgrade images; monitoring, by a security appliance coupled to the data bus, transmissions from the maintenance device of striped update hashes on the data bus; providing, to the security appliance, signed striped hashes corresponding to an upgrade image file transmitted by the maintenance device; validating the striped update hashes using information in the manifest list; when at least one of the striped update hashes fails validation, logging by the security appliance that an unauthorized upload has been attempted; and performing at least one mitigation action in response to the attempted unauthorized upload.

In accordance with yet another embodiment of the invention, an exemplary computer program product for preventing unauthorized software or firmware upgrades between two or more computing devices connected on a data bus is provided. The computer program product includes a non-transient computer readable storage medium having computer readable program code embodied thereon, the computer readable program code, when executed on at least one processor of a security appliance coupled to the data bus, causing the security appliance: to store cryptographic metadata for authorized upgrade images for updating at least one target computing device coupled to the data bus, the cryptographic metadata comprising a manifest list of upgrade images; to monitor the data bus for transmissions of striped update hashes from the maintenance device; to obtain signed striped hashes corresponding to an upgrade image file transmitted by the maintenance device; to validate the striped update hashes using information in the manifest list; to log that an unauthorized upload has been attempted when at least one of the striped update hashes fails validation; and to perform at least one mitigation action in response to the attempted unauthorized upload.

As may be used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of means for carrying out one or more of the method steps described herein; the means can include (i) hardware module(s), (ii) software and/or software module(s) stored in a computer readable storage medium (or multiple such media) and implemented on a hardware processor, or (iii) a combination of (i) and (ii); any of (i)-(iii) implement the specific techniques set forth herein.

Techniques disclosed herein can provide substantial beneficial technical effects. By way of example only and without limitation, embodiments of the invention, either individually or collectively, can provide one or more of the following advantages:

- prevents unauthorized firmware and/or software upgrade image transmissions between two or more computing devices without modifying existing hardware or software in the computing devices;
- supports passive and/or active operational modes for use with differing customer requirements and applications;
- enables inspection and validation of authorized and signed software loads during the "last mile" (i.e., movement of software from a central hub to a final destination) to the computing device;
- ability to identify and alert and/or halt an invalid software or firmware update before the update is finished transferring to the target computing device;
- no changes to the existing network architecture are required in order to benefit from message authentication measures according to aspects of the invention;
- novel approach takes advantage of existing security primitives and best practices, and enables cryptographically secure software from the OEM all the way to the target ECU/LRU;
- does not add significant time to the firmware and/or software update process.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

Non-limiting and non-exhaustive embodiments of the present invention will be described with reference to the following drawings which are presented by way of example only, wherein like reference numerals (when used) indicate corresponding elements throughout the several views unless otherwise specified, and wherein.

Figure 1:
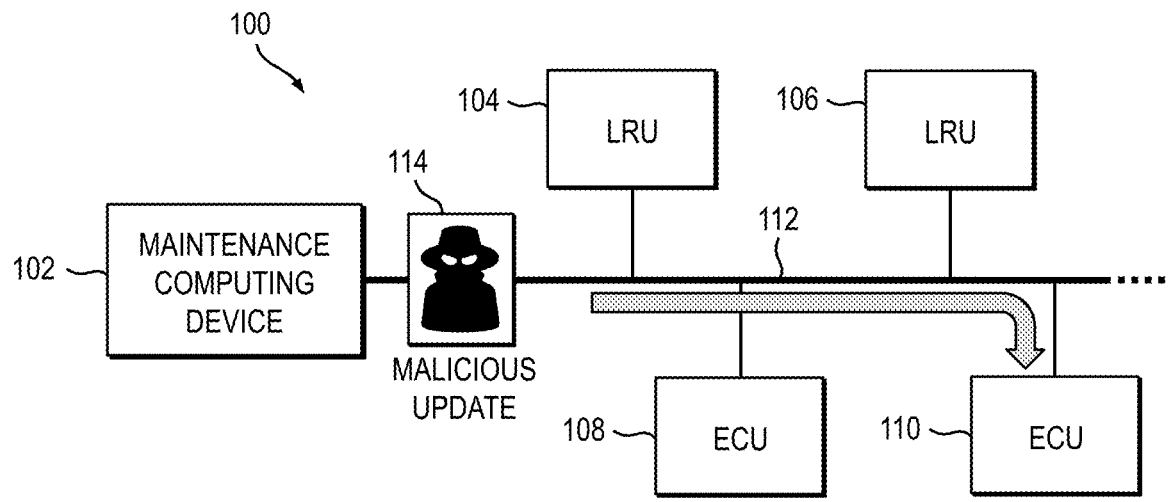
FIG. 1 is a block diagram depicting at least a portion of an exemplary system for upgrading ECUs and/or LRUs, which may be modified to incorporate aspects according to one or more embodiments of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein in the context of illustrative methods, apparatus and systems for passive monitoring and interdiction of unauthorized firmware or software upgrades between computing devices connected together on a data bus or other communication link. Embodiments of the invention are particularly well-suited to weapon systems and/or other secure systems applications. It is to be appreciated, however, that the specific methods and/or apparatus illustratively shown and described herein are to be considered exemplary as opposed to limiting. Rather, it will become apparent to those skilled in the art given the teachings herein that numerous modifications can be made to the embodiments shown that are within the scope of the appended claims. That is, no limitations with respect to the embodiments shown and described herein are intended or should be inferred.

Modern weapon systems, as well as other secure systems, operating in conventional network architectures currently have little or no protection from cyberattacks. An adversary can arbitrarily upload unauthorized firmware or software to target computing devices (e.g., electronic control units (ECUs)) connected to the network by exploiting a compromised maintenance device or by attacking the supply chain image process. Such unauthorized changes to firmware, software, and/or information poses critical security vulnerabilities and concerns. Advanced persistent threats can leverage technical data obtained from major weapon systems to develop cyber capabilities that allow asymmetric power projection in near-peer conflicts. Adversaries can degrade, disable, deny, destroy or manipulate entire fleets of weapon systems at a location and time of their choosing. The U.S. Government Accountability Office (GAO) has reported to the U.S. Senate that Department of Defense (DoD) weapon systems are highly vulnerable to cyberattacks. (See "Weapon Systems Cybersecurity: DOD Just Beginning to Grapple with Scale of Vulnerabilities," Report to the Committee on Armed Services, U.S. Senate, U.S. Government Accountability Office, October 2018, GAO-19-128, the disclosure of which is incorporated by reference herein).

Many weapon systems utilize redundant serial data buses to communicate critical information between embedded computing devices, often to referred to as line replaceable units (LRUs). LRUs allow a weapon system to perform basic tasks, such as, for example, target acquisition and prosecution, maneuver, and communication. Serial buses, while significantly reliable, are simply not designed to provide data message authentication or encryption. To mitigate this security vulnerability, most existing LRUs would require substantial redesign to implement modern security protocols and procedures, such as cryptographic signing of reprogramming images delivered across the bus, data encryption at rest, and encrypted communications. However, redesigning, integrating, testing, and fielding existing weapon systems with more secure LRUs is highly cost prohibitive and therefore not a viable solution.

In order to prevent unauthorized firmware and/or software upgrade image transmissions between two or more computing devices (e.g., ECUs, LRUs, etc.) connected through a data bus or other network connection, the present invention, as manifested in one or more embodiments, beneficially provides a mechanism for validating firmware and/or software images uploaded to the computing devices using valid cryptographic signatures, without modifying existing hardware or software in the computing device(s). This technique supports passive and/or active operational modes for use with differing customer requirements.

FIG. 1 is a block diagram depicting at least a portion of an exemplary system 100 for upgrading LRUs and/or ECUs which may be modified to incorporate aspects according to one or more embodiments of the invention. The system 100 includes a maintenance computing device 102 operatively coupled with a plurality of LRUs, 104 and 106, and a plurality of ECUs, 108 and 110, via a common data bus 112 (e.g., MIL-STD-1553 or controller area network (CAN) bus) or other connection arrangement (wired or wireless). The maintenance computing device 102 or at least a portion of the functionality thereof can, in some embodiments, be implemented using a designated one of the LRUs connected to the data bus 112. In the illustrative scenario shown in FIG. 1, a malicious software update module 114 gains access to the data bus 112, such as by exploiting certain security vulnerabilities of the maintenance computing device 102, to attack and compromise one or more of the connected LRUs/ECUs (e.g., LRU 110) by uploading malicious code to the target LRU. In other scenarios, the malicious software update module 114 may gain access to the data bus 112 through a compromised LRU/ECU.

Figure 2:
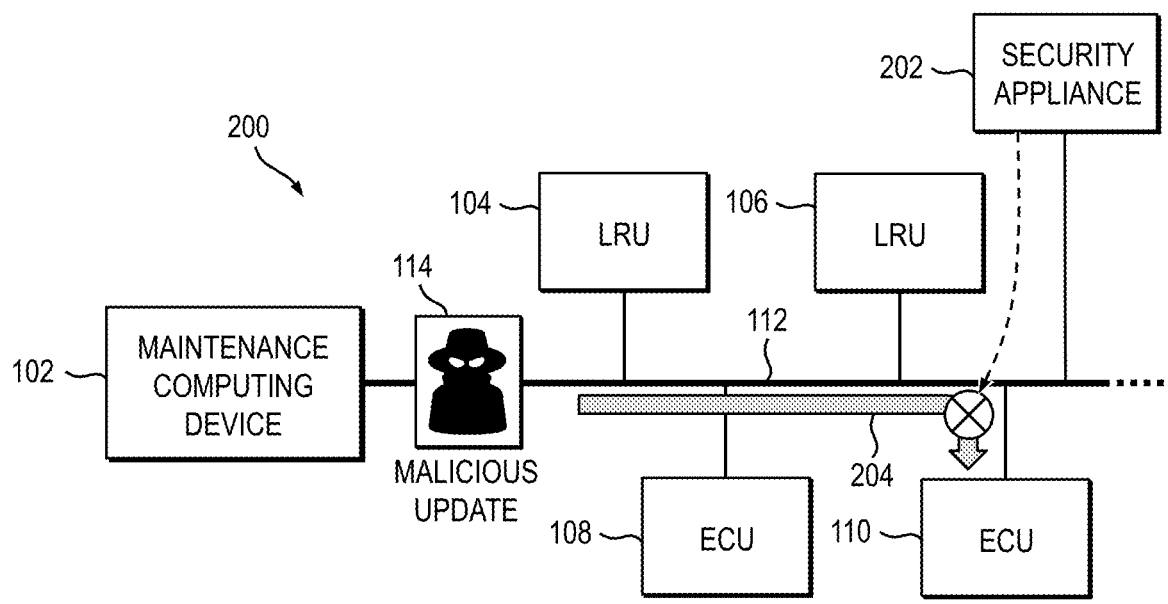
FIG. 2 is a block diagram depicting at least a portion of an exemplary system for monitoring and preventing unauthorized software or firmware upgrades between two or more connected devices, according to an embodiment of the present invention.

With reference now to FIG. 2, a block diagram depicts at least a portion of an exemplary system 200 for monitoring and preventing unauthorized software or firmware upgrades between two or more connected devices, according to an embodiment of the invention. In a manner consistent with the exemplary system 100 shown in FIG. 1, the system 200 includes a maintenance computing device 102 operatively coupled with a plurality of LRUs, 104 and 106, and a plurality of ECUs, 108 and 110, via a common data bus 112 (e.g., MIL-STD-1553 or CAN bus) or other connection arrangement (wired or wireless). The system 200 further includes a representative security module 202 coupled with the data bus 112. The security module 202, which comprises a security appliance and may include other related functional modules as well, passively monitors, alerts and, in one or more embodiments, prevents or otherwise mitigates unauthorized software or firmware upgrade image transmission between two or more devices (e.g., LRUs/ECUs 104, 106, 108, 110) connected on the data bus 112 or other connection arrangement (wired or wireless).

In one or more embodiments, the security module 202 is configured to passively monitor the data bus 112 for the transmission of unauthorized software or firmware and to initiate one or more actions in response thereto. For example, upon detection of such unauthorized activity on the data bus 112, the security module 202 may transmit a notification to the maintenance computing device 102 or other device connected to the data bus alerting a user of the attempt to transfer an unauthorized software or firmware upgrade image 204 to one or more connected devices (e.g., LRU/ECU 104, 106, 108, 110). In one or more embodiments, the security module 202, upon detection of prescribed malicious activity, is configured to prevent the transmission of unauthorized software or firmware, such as, for example, by jamming the attempted transmission 204.

One or more aspects of the invention utilize hashing which provides a fast and simple way of performing third-party validation of a software or firmware image as it is transmitted across the data bus. A hashing algorithm is a mathematical function (called hash function) which condenses data down to a fixed size; the output result is known as a hash or hash value. Hashing is employed extensively in cryptography to verify that an image is identical to the source media; it is analogous to a digital fingerprint for a file, since it is highly unlikely that two image files with different contents would ever generate the same hashes. Hashes are convenient for situations where computers may want to identify, compare, or otherwise run calculations against files and strings of data. It is easier for the computer to first compute a hash and then compare the values than it would be to compare the original files. The length of the hash typically depends on the type of hash used. There are several hashing algorithms that are commonly used, such as MD5 (Message Digest 5), SHA-1 (Secure Hash Algorithm 1), SHA-2 (Secure Hash Algorithm 2), SHA-256 (Secure Hash Algorithm 256), and others, as will be known by those skilled in the art. Cryptographically secure hashing functions are preferably utilized in the security module 202, in one or more embodiments.

Figure 3:
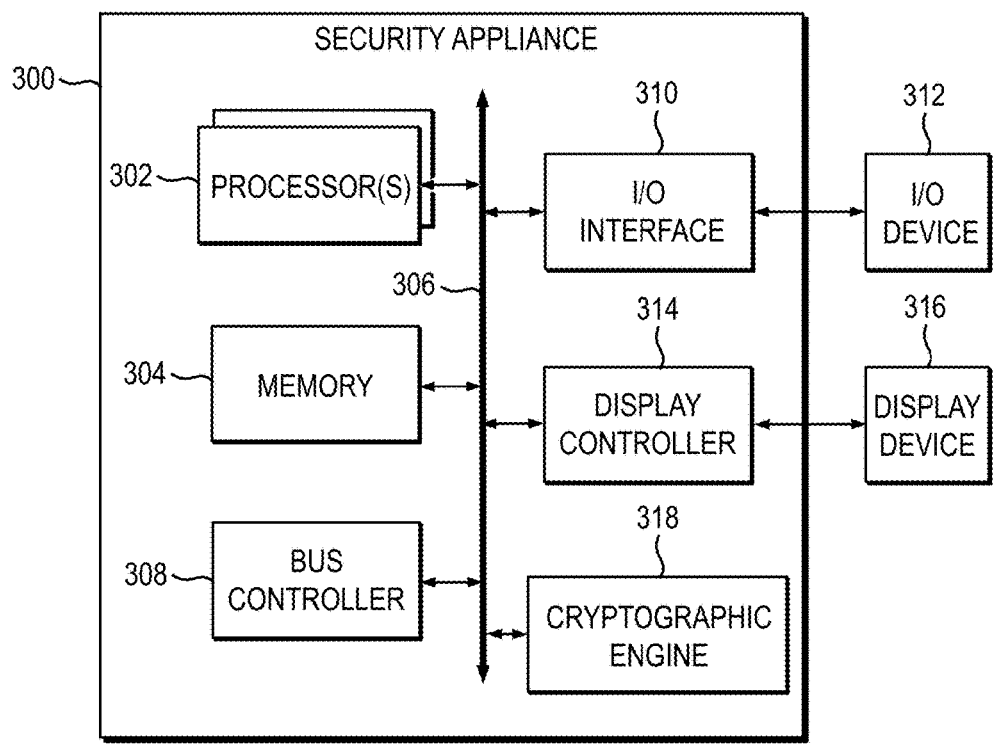
FIG. 3 is a block diagram depicting at least a portion of an exemplary security appliance 300, according to an embodiment of the present invention.

FIG. 3 is a block diagram depicting at least a portion of an exemplary security appliance 300, according to an embodiment of the invention. The security appliance 300, which may be used to implement at least a portion of the exemplary security module 202 shown in FIG. 2, preferably includes at least one processor 302 and memory 304 operatively coupled via a data bus 306, or alternative connection means. A bus controller 308, preferably a bus input/output (I/O) device, in the security appliance 300 is coupled with the data bus 306 and is configured to control the transfer of data between functional modules connected to the bus, such as by using a standard data communication protocol (e.g., MIL-STD-1553 bus, CAN bus, etc.).

The security appliance 300 further includes an input/output (I/O) controller 310 operatively coupled to the data bus 306 and adapted to provide an interface between an I/O device(s) 312 (e.g., keyboard, mouse, external disk drive, flash memory, etc.), with which the security appliance may be in communication, and the data bus. Similarly, a display controller 314 is operatively coupled to the data bus 306 and adapted to provide an interface between a display device(s) 316 (e.g., liquid crystal display (LCD)), with which the security appliance 300 may be in communication, and the data bus.

A cryptographic engine 318 included in the security appliance 300 is coupled to the data bus 306 and in operative communication with the processor(s) 302. In conjunction with the processor(s) 302, the cryptographic engine 318 is preferably configured to encode a message or information in such a way that only authorized parties can access it. In a standard encryption scheme, the intended message or information, referred to as plaintext, is encrypted using an encryption algorithm, referred to as a cipher, to generate ciphertext that can be read only once it has been decrypted. The encryption scheme typically employs a pseudo-random encryption key generated by an algorithm (e.g., symmetric or public encryption keys).

Figure 4:
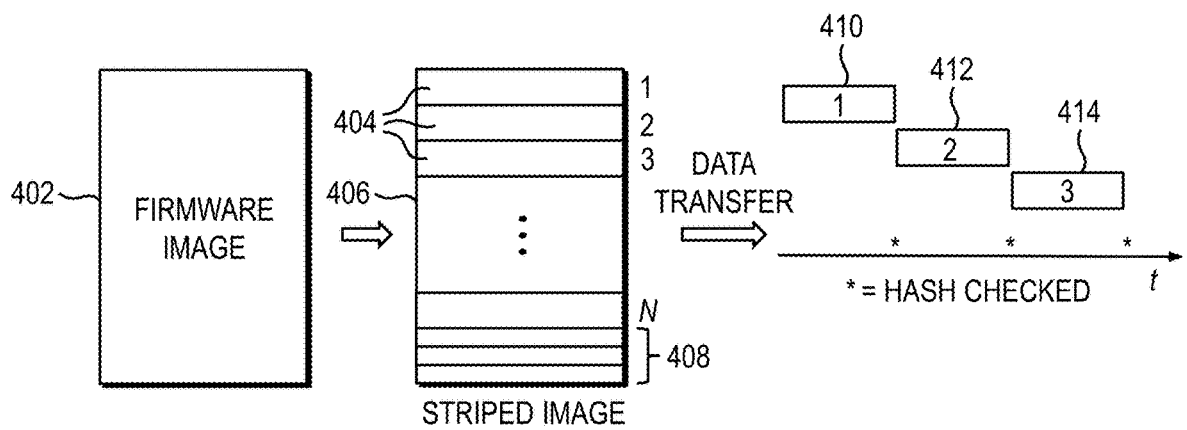
FIG. 4 conceptually depicts an illustrative striping of a firmware image, which may be utilized by one or more embodiments of the present invention.

As a way of reducing complexity and increasing processing speed in the security module 202 shown in FIG. 2, among other benefits, the software or firmware upgrade image is divided into multiple blocks or stripes in order to create manageable chunks of data to hash, according to one or more embodiments. FIG. 4 conceptually depicts an illustrative striping of a firmware image, which may be utilized by one or more embodiments of the invention. As shown in FIG. 4, a software or firmware upgrade image 402 is partitioned into a plurality, N (where N is an integer), of data blocks or stripes 404 to generate a corresponding striped image 406. Preferably, the data striping is handled by the organization creating the firmware upgrade image for uploading (e.g., an original equipment manufacturer (OEM)), although the data striping need not be performed by the organization originating the firmware upgrade image. A size of each of the data stripes 404 is adjustable and is not limited by embodiments of the invention. Optionally, a final subset of data stripes 408 may be different (e.g., smaller or larger) in size than preceding data stripes 404 in the striped image 406 to facilitate malicious code detection, according to one or more alternative embodiments. Embodiments of the invention are not limited to any specific size and/or number of data stripes in the final subset of data stripes 408. In this optional scenario, the overall striped image 406 is comprised of the data stripes 404 and the final subset of data stripes 408.

With the striping of the firmware upgrade image 402, each of the data stripes 404 are individually hashed, according to one or more embodiments, to generate corresponding striped signed hashes, 410, 412, 414; hash 410 corresponds to data stripe 1, hash 412 corresponds to data stripe 2, hash 414 corresponds to data stripe 3, and so on. A "signed hash" refers to data hashes that are verified; that is, the hash is signed with a user's private key, and the signer's public key is exported so that the signature can be verified. A process for signing hashes that is suitable for use in connection with embodiments of the invention is described, for example, in the Wikipedia article "Electronic Signature" (https://en.wikipedia.org/wiki/Electronic signature), the disclosure of which is incorporated herein by reference in its entirety for all purposes. Other processes for signing hashes will be known by those skilled in the art.

To improve data throughout and efficiency, the firmware image hashing can be performed using multiple processors in a distributed manner. In accordance with one or more embodiments of the invention, the signed hashes 410, 412, 414 and corresponding signature(s) are transmitted across the system data bus (e.g., 112 in FIG. 2) before the corresponding firmware upgrade image 402 as part of a manifest list, so that a third-party computing device (e.g., security appliance) can monitor and collect the signed hashes. Subsequently, the third-party computing device receives the signed hashes and compares them with the hashes from the manifest list to verify the authenticity of the received image (i.e., hash check).

The manifest list for each software or firmware image comprises information associated with the image. The manifest list preferably comprises the hashes and corresponding signature(s). In some embodiments, there may be a single signature verifying all of the hashes associated with the upgrade image. Alternatively, each hash may be individually signed. Such information in the manifest list may include, for example, image version number, target ECU/LRU information, image size, image cryptographic chunk size, cryptographic support information (e.g., specific type of one way function being used to hash the chunk), a list of chunk hashes, hashed by a prescribed algorithm specified in the cryptographic support information section, public key, Certificate Authority (CA), any intermediate CA key chains and sets, file certificate and hash, among other information contained in the manifest list. The manifest list may also include metadata.

Figure 5A:
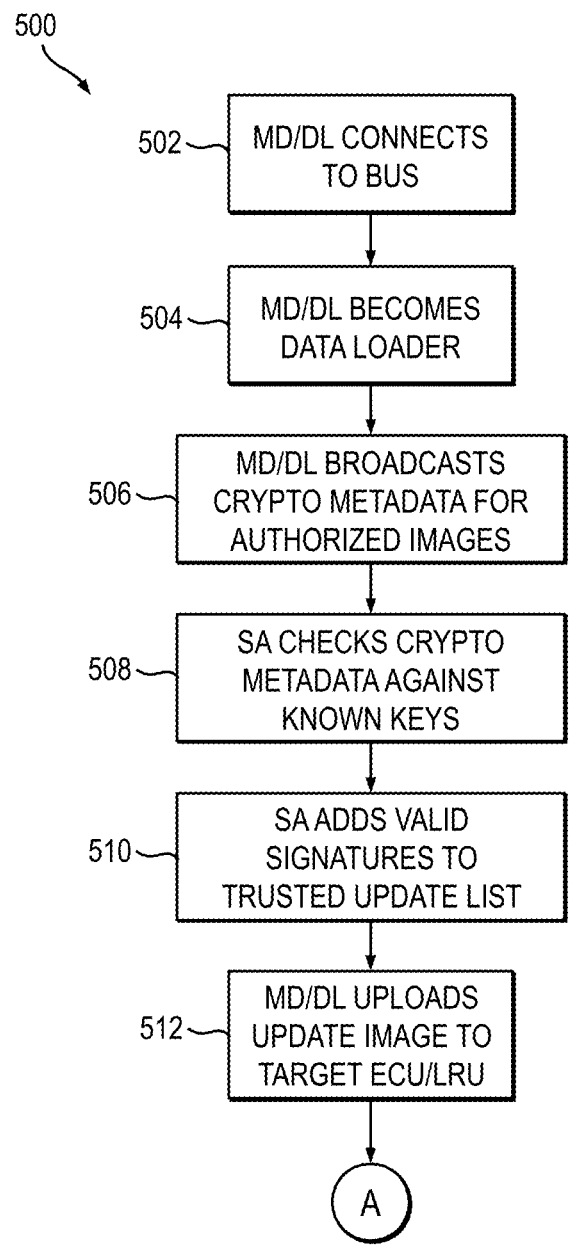
FIGS. 5A and 5B are flow diagrams depicting at least a portion of an exemplary method for monitoring and prevention of unauthorized software or firmware upgrade image between two or more computing devices connected on a data bus or network, according to an embodiment of the present invention.
Figure 5B:
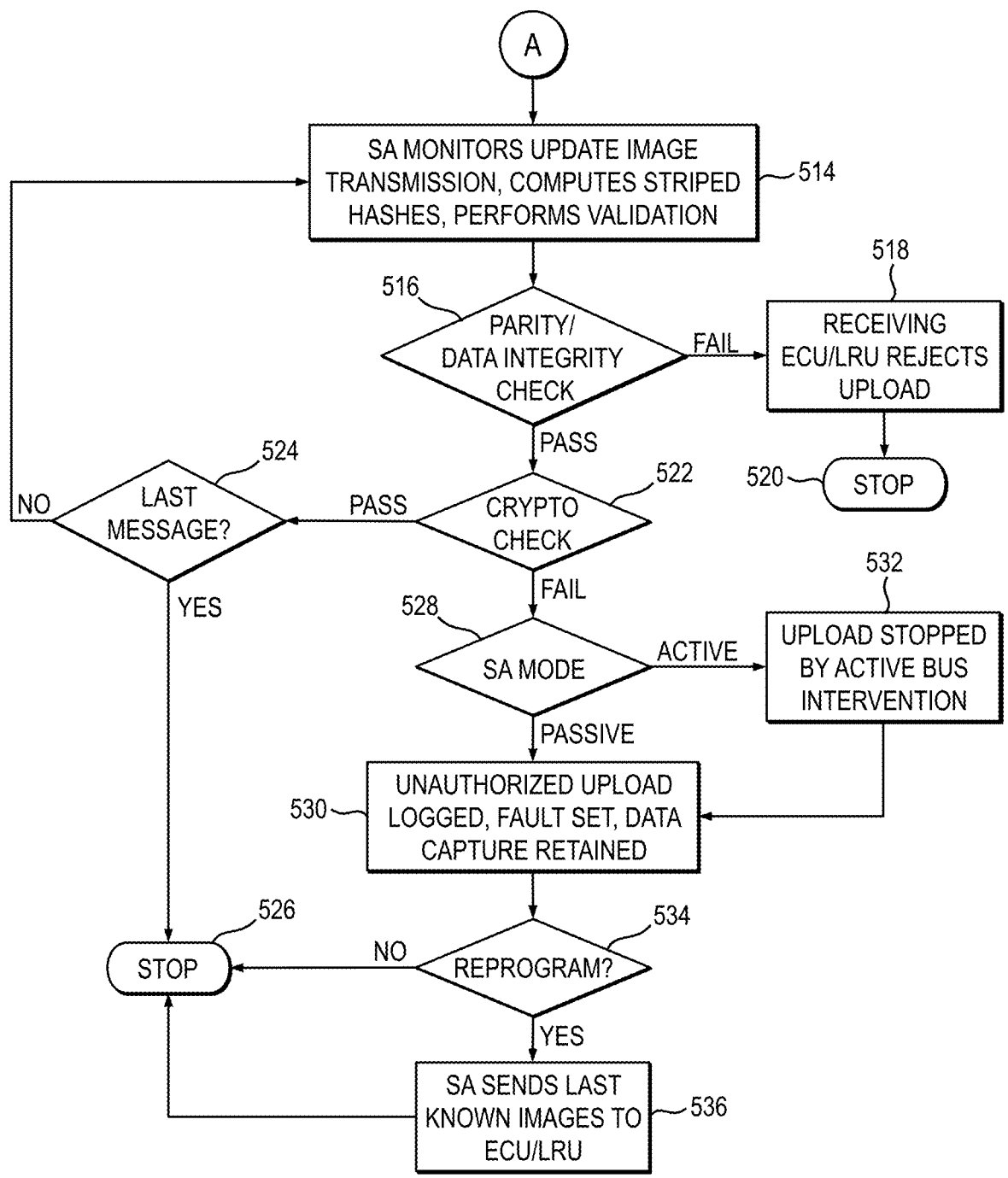

FIGS. 5A and 5B are flow diagrams depicting at least a portion of an exemplary method 500 for passive monitoring and prevention of unauthorized software or firmware upgrade image between two or more computing devices (e.g., ECUs and/or LRUs) connected on a data bus or network, according to an embodiment of the invention. This method 500 is preferably implemented by a security appliance (e.g., residing in representative security module 202 in FIG. 2, or security appliance 300 in FIG. 3) that is operatively coupled to the same data bus to which the one or more computing devices being protected are connected.

It is to be appreciated that prior to initiating the method 500, vendor-specific intermediate keys/certificates that have been signed by a trusted root key/certificate are preferably distributed to the connected computing devices. Vendors sign and certify their software or firmware upgrade images using the intermediate key/certificate and by running a prescribed application configured to generate specific broadcast messages that are transmitted during the software/firmware uploader verification process of image uploading to the system, as will be described in further detail herein below. Upgrade images are preferably distributed through existing supply chain mechanisms and processes, as will be known to those skilled in the art.

With reference now to FIG. 5A, in step 502 a maintenance device (MD) or data loader (DL) containing authorized software or firmware images is connected to a data bus or network (e.g., data bus 112 in FIG. 2) of a system which includes one or more ECUs/LRUs to be upgraded (i.e., updated). The system is equipped with a security appliance (SA), that may, in one or more embodiments, be implemented using an ECU or LRU running verification software, which monitors the data bus. The security appliance comprises an intermediate key/certificate signed by the same trusted root key/certificate which was used to sign the validated hashes from the vendor. In step 504, the MD or DL is configured as the data loader for upgrading one or more ECUs and/or LRUs connected to the data bus.

In step 506, the MD or DL broadcasts messages on the data bus or network to all ECUs/LRUs, transmitting cryptographic metadata for authorized upgrade images. The cryptographic metadata, in one or more embodiments, comprises a manifest list of upgrade images (software or firmware), which may include information such as, but not limited to, image version number, target ECU/LRU information, image size, image cryptographic chunk size, cryptographic support information (e.g., specific type of one way function being used to hash the chunk), a list of chunked hashes and/or signature(s) of chunked hashes, hashed by a prescribed function/algorithm specified in the cryptographic support information section, public key, Certificate Authority (CA), any intermediate CA key chains and sets, and/or file certificate and hash, and metadata, among other information.

In step 508, the security appliance, operating in a passive, read-only mode (e.g., MIL-STD 1553 "bus monitor" mode, Aeronautical Radio, Incorporated (ARINC) "data recorder," CAN receiver, etc.), receives and records the cryptographic metadata (e.g., manifest list) and image files into memory. The security appliance checks this cryptographic metadata with known keys to verify the signatures in the metadata. The security appliance records verified and unverified image data in its permanent memory store in step 510; valid signatures are added to a trusted update list, and invalid signatures are logged as a security fault, in one or more embodiments. In some embodiments, the security appliance records all upgrade images, valid and invalid, maintaining versioning as allocated memory space permits, to enable prescribed actions such as, for example, self-healing or self-reprogramming functionality across the data bus or network, incident response, and forensic inspection, among other actions.

The MD or DL, in step 512, transmits (i.e., uploads) unencrypted update images to target ECUs/LRUs, preferably using standard update procedures and routines known by those skilled in the art. During the update transmissions, the security appliance monitors the data bus or network and, in one or more embodiments, records all transmitted data from the MD or DL in step 514, accumulating update image chunks (i.e., striped update image data) according to the chunk size specified in the appropriate update image file. As each chunk is accumulated, the security appliance hashes the striped image data (i.e., image chunks) with a hashing function specified in the manifest image file, and compares the results of the hashing function to the trusted (i.e., signed) update list of valid hash stripes in the image file from the manifest to validate the striped hashes.

By combining rules-based and signature-based heuristics, advanced statistical methods, machine learning algorithms and artificial intelligence (AI), the security appliance can provide reliable continuous monitoring, as part of the functionality performed in step 514 for example, without generating false positives. For example, in one or more embodiments, AI and/or machine learning algorithms can be employed which are adapted to learn the transmitted data traffic patterns to determine anomalies in normal data traffic patterns in monitoring the data bus or network.

In step 516, the method 500 performs a parity/data integrity check (e.g., cyclic redundancy check (CRC)) as part of a data validation process, to confirm that the received data has not been corrupted. If the parity/data integrity check fails, the receiving ECU/LRU is configured to reject the upload in step 518 and the method stops in step 520. The assumption is that if the parity/data integrity check fails, indicating that the data has been somehow corrupted during the transmission, it will also not pass a cryptographic validation process. Although step 516 may optionally be omitted in some embodiments, rejecting the upload upon detection of a parity/data integrity check failure saves computation time and reduces redundancy in the overall method 500. Alternatively, if the parity/data integrity check passes, the security appliance performs a cryptography check in step 522 to validate the striped hashes. The cryptography check may include, for example, the security appliance comparing the received striped hashes with signed striped hashes obtained from the entity creating the update image for upload.

If the striped hash passes the cryptography check, step 524 checks to see if there are any further striped update image messages to process. If the last striped update image message has been received, the method 500 stops at step 526. Alternatively, if the last striped update image message has not yet been received, the method 500 continues to monitor the data bus for update image transmissions in step 514 and the method 500 proceeds as previously described.

If the cryptography validation performed in step 522 fails, step 528 determines whether the security appliance is operating in an active mode or a passive mode. If the security appliance is configured to provide passive defense (i.e., passive mode) and a striped update image chunk does not pass validation, the security appliance logs a security event in step 530 and queues a fault code for the MD or DL, which is indicative of an unauthorized (or otherwise corrupted) upload. Following an update event, the maintenance computing device, in one or more embodiments, queues ECUs or LRUs on the data bus or network for maintenance faults. Optionally, any anomalies or faults are reported from the security appliance to the maintenance computing device at that time as high priority fault codes with remediation direction and contact instructions. The data capture may be retained (e.g., in memory, as historical data) for subsequent inspection.

Alternatively, if the security appliance is configured to provide active defense (i.e., active mode) and a striped update image chunk does not pass validation, the security appliance interdicts on the data bus or network and prevents further transmission from the maintenance computing device to the target ECU or LRU in step 532. The method 500 then continues to log the security event in step 530 and queue the fault code for the MD or DL. Thus, the security event is logged and fault code queued in step 530 for either passive or active modes.

If the only modified data in a malicious image is located in the last hashed data stripe/chunk, which can only be validated after transmission, the security appliance, in one or more embodiments, is configured to jam or otherwise disrupt the last message transmission, for example by interfering with the cyclic redundancy check (CRC), in order to prevent the ECU/LRU being updated from accepting the image. Jamming, as the term is used herein, is intended to broadly refer to interference with existing data communications caused by the intentional transmission of interfering signals on the same bus. If the last chunk validates, the last message is repeated; if the last chunk fails to validate, the message is continually jammed until the transmission fails. Jamming may be performed as at least part of the active bus intervention functionality in step 532. It is to be appreciated that other mechanisms for preventing the ECU/LRU being updated from accepting the image are similarly contemplated, as will become apparent to those skilled in the art given the teachings herein.

When a striped update image chunk does not pass validation, regardless of whether the security appliance is configured to provide passive or active defense (i.e., passive or active modes, respectively), the method 500 determines whether reprogramming of the target ECU or LRU is required in step 534. If no reprogramming is required, the method 500 stops at step 526. Alternatively, if reprogramming is to be performed, the security appliance sends the last known valid images to the target ECU or LRU in step 536, and the method 500 stops at step 526.

The security appliance, in one or more embodiments, can be configured to automatically scan for certain maintenance faults or operating status from internal ECUs and/or LRUs and automatically, or in response to user input, reprogram a failing ECU or LRU with the last known validated image stored in internal memory. In one or more embodiments, the security appliance is configured to automatically block all upgrade functionality unless the manifest is transmitted prior to a data transfer and appropriately validated.

By way of illustration only and without limitation, consider a basic scenario for passively monitoring and preventing an unauthorized firmware or software upgrade between computing devices A and B connected together on a common data bus. Computing device C, also connected to the data bus, is configured as a security appliance according to one or more embodiments of the invention and is configured to monitor and send data traffic on the data bus. Computing device A broadcasts a manifest of cryptographically signed authorized software comprising one or more publishers' public keys, and software patch signatures. Within the manifest, for each software patch, the patch is divided into a number of stripes (i.e., chunks), hashed with a one-way function and signed by a publisher's private key. As computing device A transmits the software patch to computing device B; computing device C monitors, calculates and validates each message chunk. If a chunk fails due to signature incongruence, computing device C intercedes on the data bus and jams the update transmission. Computing device A, or a substitute, can poll computing device C for a fault code which computing device C will read out. Computing device B is typically programmed to time out and revert to the existing software load (AB functionality).

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary apparatus illustrated in the accompanying figures (e.g., security appliance 300 shown in FIG. 3), or portions thereof, may be part of an integrated circuit. Integrated circuits so manufactured are considered part of this invention.

Those skilled in the art will appreciate that the exemplary apparatus discussed above, or portions thereof, can be distributed in raw form (i.e., a single wafer having multiple unpackaged chips), as bare dies, in packaged form, or incorporated as parts of intermediate products or end products that benefit from systems and apparatus for passive monitoring and interdiction of unauthorized firmware or software upgrades between computing devices, according to one or more embodiments of the invention.

An integrated circuit in accordance with aspects of the present disclosure can be employed, for example, in essentially any weapon systems and/or other secure systems, among other applications. Systems incorporating such integrated circuits are considered part of this invention. Given the teachings of the present disclosure provided herein, one of ordinary skill in the art will be able to contemplate other implementations and applications of embodiments of the invention.

Embodiments of the present invention, or portions thereof, may also be implemented in the form of a system, a method, and/or a computer program product. In one or more embodiments, the computer program product may include a non-transitory computer readable storage medium (or media) having computer readable program instructions thereon for causing a processor or other controller, such as, for example, the processor(s) 302 and/or the cryptographic engine 318 in the security appliance 300 shown in FIG. 3, to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network (e.g., wireless LAN (WLAN)). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each of at least a subset of blocks of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block(s).

The flowchart and block diagrams in the accompanying figures illustrate the architecture, functionality, and operation of possible implementations of systems, methods, and computer program products according to one or more embodiments of the invention. In this regard, each of at least a subset of the blocks in the block diagrams and/or flowchart illustration may represent a module, segment, or portion of instructions, which comprises one or more executable instructions for implementing the specified function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that in one or more embodiments, each of at least a subset of blocks in the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, to the extent that such terms are used herein, where an element is referred to as being "connected" or "coupled" to another element, it can be directly connected or coupled to the other element or intervening elements can be present. In contrast, when an element is referred to as being "directly connected" or "directly coupled" to another element, there are no intervening elements present. Furthermore, positional terms such as "above," "below," "upper" and "lower," when used, are intended to indicate relative positioning of elements or structures to each other as opposed to absolute position.

The illustrations of embodiments of the invention described herein are intended to provide a general understanding of the various embodiments, and they are not intended to serve as a complete description of all the elements and features of apparatus and systems that might make use of the structures and semiconductor fabrication methodologies described herein. Many other embodiments will become apparent to those skilled in the art given the teachings herein; other embodiments are utilized and derived therefrom, such that structural and logical substitutions and changes can be made without departing from the scope or spirit of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein but within the scope of the present invention, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the present invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for preventing unauthorized software or firmware upgrades between two or more computing devices connected on a data bus, the method comprising:
    transmitting, by a maintenance device coupled to the data bus, cryptographic metadata for authorized upgrade images to at least one target computing device coupled to the data bus, the cryptographic metadata comprising a manifest list of upgrade images;
    monitoring, by a security appliance coupled to the data bus, transmissions from the maintenance device of striped update hashes on the data bus;
    providing, to the security appliance, signed striped hashes corresponding to an upgrade image file transmitted by the maintenance device;
    validating the striped update hashes using information in the manifest list;
    when at least one of the striped update hashes fails validation, logging by the security appliance that an unauthorized upload has been attempted before the unauthorized upload completes; and
    performing at least one mitigation action, before the unauthorized upload completes, in response to the attempted unauthorized upload,
    wherein the upgrade image file comprises at least first and second subsets of signed striped hashes, the first subset of signed striped hashes being different in size relative to the second subset of signed striped hashes.

2. The method of claim 1, wherein when at least one of the signed striped hashes fails validation, the method further comprises:
    when the security appliance is configured in a passive mode, queuing a fault code for the maintenance device which is indicative of an unauthorized upload; and
    when the security appliance is configured in an active mode, intervening on the data bus to prevent further transmission from the maintenance device to the target computing device.

3. The method of claim 2, wherein intervening on the data bus comprises the security appliance transmitting interfering signals on the data bus, the interfering signals being configured to disrupt transmissions from the maintenance device to the target computing device.

4. The method of claim 1, further comprising:
    determining whether there are any further signed striped hashes to process;
    when a last signed striped hash has been received, stopping the method; and
    when the last signed striped hash has not yet been received, continuing to monitor the data bus for update image transmissions.

5. The method of claim 1, further comprising:
    performing a data integrity check as part of a data validation process to confirm that an update image transmission received from the maintenance device has not been corrupted; and
    when the data integrity check fails, rejecting, by the target computing device, the update image transmission and stopping the method.

6. The method of claim 1, further comprising:
    when at least one of the striped update hashes fails validation, determining whether reprogramming of the target computing device is required;
    when it is determined that reprogramming of the target computing device is required, transmitting, by the security appliance, one or more last known valid update images to the target computing device; and
    when it is determined that reprogramming of the target computing device is not required, stopping the method.

7. The method of claim 1, wherein validating the signed striped hashes comprises comparing the striped update hashes transmitted by the maintenance device with signed striped hashes provided to the security appliance and, when the striped update hashes match the signed striped hashes, the security appliance indicating that the striped update hashes are valid.

8. The method of claim 1, wherein the manifest list comprises at least one of image version number, target computing device information, image size, image cryptographic chunk size, cryptographic support information, a list of chunked hashes and/or signature of chunked hashes, type of hash function used to generate the striped update hashes, public key, Certificate Authority (CA), intermediate CA key chains and sets, file certificate and hash, and metadata.

9. The method of claim 1, further comprising the security appliance, operating in a passive mode, receiving and recording the cryptographic metadata and image files into memory.

10. The method of claim 9, further comprising:
    the security appliance checking the cryptographic metadata with known keys to verify signatures in the metadata; and
    the security appliance recording verified and unverified image data in memory, wherein valid signatures are added to a trusted update list and invalid signatures are logged as a security fault.

11. The method of claim 1, wherein a final subset of the signed striped hashes corresponding to the upgrade image file is different in size relative to other signed striped hashes to facilitate malicious code detection.

12. An apparatus for preventing unauthorized software or firmware upgrades between two or more computing devices connected on a data bus, the apparatus comprising:
    at least one processor;
    memory coupled with the at least one processor; and
    a cryptographic engine coupled with the at least one processor, the cryptographic engine storing cryptographic metadata for authorized upgrade images for updating at least one target computing device coupled to the data bus, the cryptographic metadata comprising a manifest list of upgrade images;
    wherein the at least one processor is configured:
        to monitor the data bus for transmissions of striped update hashes from a maintenance device coupled to the data bus;

to obtain signed striped hashes corresponding to an upgrade image file transmitted by the maintenance device;

to validate the striped update hashes using information in the manifest list;

to log that an unauthorized upload has been attempted when at least one of the striped update hashes fails validation before the unauthorized upload completes; and to perform at least one mitigation action, before the unauthorized upload completes, in response to the attempted unauthorized upload, wherein the upgrade image file comprises at least first and second subsets of signed striped hashes, the first subset of signed striped hashes being different in size relative to the second subset of signed striped hashes.

13. The apparatus of claim 12, wherein when at least one of the signed striped hashes fails validation and the apparatus is configured in a passive mode, the at least one processor is further configured to queue a fault code for the maintenance device which is indicative of an unauthorized upload, and when at least one of the signed striped hashes fails validation and the apparatus is configured in an active mode, the at least one processor is further configured to intervene on the data bus to prevent further transmission from the maintenance device to the at least one target computing device.

14. The apparatus of claim 13, wherein in intervening on the data bus, the at least one processor is configured to cause the apparatus to transmit interfering signals on the data bus, the interfering signals being configured to disrupt transmissions from the maintenance device to the target computing device.

15. The apparatus of claim 12, wherein the at least one processor is further configured:
to determine whether there are any further signed striped hashes to process;
to stop monitoring the data bus when a last signed striped hash has been received; and
to continue monitoring the data bus when the last signed striped hash has not been received.

16. The apparatus of claim 12, wherein the at least one processor is further configured:
to perform a data integrity check as part of a data validation process for confirming that an update image transmission received from the maintenance device has not been corrupted; and
when the data integrity check fails, thereby causing the target computing device to reject the update image transmission, to stop monitoring the data bus.

17. The apparatus of claim 12, wherein the at least one processor is further configured:
to determine whether reprogramming of the target computing device is required when at least one of the striped update hashes fails validation;
to cause the apparatus to transmit one or more last known valid update images to the target computing device when it is determined that reprogramming of the target computing device is required; and
to stop monitoring the data bus when it is determined that reprogramming of the target computing device is not required.

18. The apparatus of claim 12, wherein in validating the signed striped hashes, the at least one processor is configured to compare the striped update hashes transmitted by the maintenance device with signed striped hashes provided to the apparatus and, when the striped update hashes match the signed striped hashes, to indicate that the striped update hashes are valid.

19. The apparatus of claim 12, wherein the manifest list comprises at least one of image version number, target computing device information, image size, image cryptographic chunk size, cryptographic support information, a list of chunked hashes and/or signature of chunked hashes, type of hash function used to generate the striped update hashes, public key, Certificate Authority (CA), intermediate CA key chains and sets, file certificate and hash, and metadata.

20. The apparatus of claim 12, wherein when the apparatus is operating in a passive mode, the at least one processor is configured to receive and record the cryptographic metadata and image files into the memory.

21. The apparatus of claim 20, wherein the at least one processor is further configured:
to check the cryptographic metadata with known keys to verify signatures in the metadata; and
to record verified and unverified image data in the memory, wherein valid signatures are added to a trusted update list and invalid signatures are logged as a security fault.

22. The apparatus of claim 12, wherein a final subset of the signed striped hashes corresponding to the upgrade image file is different in size relative to other signed striped hashes to facilitate malicious code detection.

23. A computer program product for preventing unauthorized software or firmware upgrades between two or more computing devices connected on a data bus, the computer program product comprising a non-transient computer readable storage medium having computer readable program code embodied thereon, the computer readable program code, when executed on at least one processor of a security appliance coupled to the data bus, causing the security appliance:
to store cryptographic metadata for authorized upgrade images for updating at least one target computing device coupled to the data bus, the cryptographic metadata comprising a manifest list of upgrade images;
to monitor the data bus for transmissions of striped update hashes from the maintenance device;
to obtain signed striped hashes corresponding to an upgrade image file transmitted by the maintenance device;
to validate the striped update hashes using information in the manifest list;
to log that an unauthorized upload has been attempted when at least one of the striped update hashes fails validation before the unauthorized upload completes; and
to perform at least one mitigation action, before the unauthorized upload completes, in response to the attempted unauthorized upload,
wherein a final subset of the signed striped hashes corresponding to the upgrade image file is different in size relative to other signed striped hashes to facilitate malicious code detection.

24. The computer program product of claim 23, wherein the upgrade image file comprises at least first and second subsets of signed striped hashes, the first subset of signed striped hashes being different in size relative to the second subset of signed striped hashes.

* * * * *